US 9,238,476 B2

(12) United States Patent
Oishi et al.

(10) Patent No.: US 9,238,476 B2
(45) Date of Patent: Jan. 19, 2016

(54) TILT STEERING APPARATUS

(71) Applicant: NSK LTD., Tokyo (JP)

(72) Inventors: Tasuku Oishi, Gunma (JP); Shigeo Shinohara, Gunma (JP); Tetsuo Arakawa, Gunma (JP)

(73) Assignee: NSK Ltd. (JP)

( * ) Notice: Subject to any disclaimer, the term of this patent is extended or adjusted under 35 U.S.C. 154(b) by 0 days.

(21) Appl. No.: 14/397,684

(22) PCT Filed: Jan. 20, 2014

(86) PCT No.: PCT/JP2014/050984
§ 371 (c)(1),
(2) Date: Oct. 29, 2014

(87) PCT Pub. No.: WO2014/115685
PCT Pub. Date: Jul. 31, 2014

(65) Prior Publication Data
US 2015/0069746 A1 Mar. 12, 2015

(30) Foreign Application Priority Data

Jan. 22, 2013 (JP) .................. 2013-008919
Aug. 8, 2013 (JP) .................. 2013-165446
Oct. 7, 2013 (JP) .................. 2013-210117
Dec. 11, 2013 (JP) .................. 2013-255656

(51) Int. Cl.
B62D 1/187 (2006.01)
B62D 1/19 (2006.01)

(52) U.S. Cl.
CPC .............. B62D 1/195 (2013.01); B62D 1/187 (2013.01)

(58) Field of Classification Search
CPC .......... B62D 1/187; B62D 1/19; B62D 1/192; B62D 1/195
See application file for complete search history.

(56) References Cited

U.S. PATENT DOCUMENTS

2005/0225068 A1 10/2005 Ishida et al.
2005/0236825 A1 10/2005 Sawada et al.
2011/0203403 A1 8/2011 Maniwa et al.
2012/0285285 A1 11/2012 Tinnin
2012/0318092 A1 12/2012 Kuroumaru

FOREIGN PATENT DOCUMENTS

JP 2006-159920 6/2006
JP 2011-218941 11/2011

Primary Examiner — Paul N Dickson
Assistant Examiner — Timothy Wilhelm
(74) Attorney, Agent, or Firm — Hartman Global IP Law; Gary M. Hartman; Domenica N. S. Hartman

(57) ABSTRACT

Construction is achieved in which a steering column 4b and a support bracket 17b are able to smoothly displace in the forward direction during a secondary collision. Spring-side locking sections 40 of a bias spring 32a engage with locking tabs 41 of the support bracket 17b in a state so as to press downward on the locking tabs 41. A pressure section 35a of the bias spring 32a engages with a receiving surface of the steering column 4b in a state so as to cause an upward pressure force to act on the steering column 4b. During a secondary collision, when the bias spring 32a displaces in the forward direction during the stroke through which the steering column 4b and support bracket 17b are able to displace in the forward direction and interferes with a gear housing 12 of a steering-assist apparatus 5, the locked state between the spring-side locking sections 40 and the locking tabs 41 is released, which allows the steering column 4b and the support bracket 17b to smoothly displace further in the forward direction.

9 Claims, 11 Drawing Sheets

TILT STEERING APPARATUS

TECHNICAL FIELD

The present invention relates to a tilt steering apparatus that has a tilt mechanism for adjusting the up-down position of a steering wheel, and a shock-absorbing apparatus for protecting a driver that collides with the steering wheel during a collision accident.

BACKGROUND ART

As illustrated in FIG. 8, a steering apparatus is constructed so that movement of a steering wheel 1 is transmitted to a steering gear by way of a steering shaft 2, and a steering angle is applied to steered wheels 3 on the left and right. Moreover, the positional relationship between the steering wheel 1 and the driver changes depending on the size and driving posture of the driver, so tilt and telescopic steering apparatuses that have a function for adjusting the forward-backward position and up-down position of the steering wheel 1 are widely used.

FIG. 9 and FIG. 10 illustrate a conventional tilt and telescopic steering apparatus as disclosed in JP 2011-218941 (A). This steering apparatus has an electric powered power-steering apparatus that has: a steering shaft 2 that has a rear end to which a steering wheel 1 is fastened; a steering column 4 that supports the steering shaft 2 on the inside thereof so as to rotate freely; a steering-assist apparatus 5 that applies an assist torque to the steering shaft 2; and a steering gear unit 7 for causing tie rods 6 to displace based on the rotation of the steering shaft 2. In this specification, the forward-backward direction is the forward and backward direction of the vehicle.

The steering shaft 2 has an inner shaft 8 and outer shaft 9 that are combined together so as to be capable of transmitting rotation force, and capable of relative displacement in the axial direction. By the displacement in the axial direction of the inner shaft 8 and outer shaft 9, it becomes possible to not only adjust the forward-backward position of the steering wheel 1, but by the entire length of the steering shaft 2 contracting during a collision accident, it becomes possible to lessen impact on the driver that collides with the steering wheel 1.

The steering column 4 is formed by fitting the portion on the front-end side of an outer column 11 that is arranged on the rear side around the outside of the portion on the rear-end side of an inner column 10 that is arranged on the front side so that relative displacement is possible in the axial direction, and so as to be capable of extending or contracting in the axial direction with the steering shaft 2. The front-end section of the inner column 10 is connected and fastened to the rear-end surface of a gear housing 12 of the steering-assist apparatus 5. Moreover, the inner shaft 8 is inserted inside the gear housing 12, and the front-end section of the inner shaft 8 is connected to the input shaft of the steering-assist apparatus 5. The output shaft 13 of the steering-assist apparatus 5 is linked to the input shaft by way of a torsion bar, and the front-end section of the output shaft 13 protrudes from the front-end surface of the gear housing 12 and is linked to the steering-gear unit 7 by way of an intermediate shaft and universal joint.

The inner column 10 is supported by part of the vehicle body 15 by way of the gear housing 12 and a front-side support bracket 14. The gear housing 12 is supported by the front-side support bracket 14 so as to be able to pivot freely around a pivot shaft 16. The portion near the front end of the outer column 11 is supported by part of the vehicle body 15 by way of a rear-side support bracket 17. The rear-side support bracket 17 is supported by the vehicle body 15 so as to be able to separate in the forward direction when a strong impact is applied in the forward direction.

As illustrated in FIG. 10, in order to make it possible for the rear-side support bracket 17 to separate in the forward direction, connecting plates 19 are provided on the top-end sections of both of a pair of left and right support-plate sections 18 of the rear-side support bracket 17 so as to protrude out in a direction toward the sides of the steering column 4. Notches 20 are provided in the connecting plates 19 and are open on the rear-end edges of the connecting plates 19. Capsules 21 that are fastened to the vehicle body by bolts (not illustrated in the figure) are locked into the notches 20. Engaging grooves 22 for engaging with the edges on the left and right of the notches 20 of the connecting plates 19 are formed on the surfaces of the left and right sides of the capsules, and through holes 23 in the up-down direction through which the bolts are inserted are formed in the middle sections of the capsules 21.

During a collision accident, the driver's body applies a large impact load in the forward direction to the steering column 4 by way of the steering wheel 1 and steering shaft 2. As a result, the steering shaft 2 and steering column 4 have a tendency to contract over the entire length while absorbing the impact energy. When this happens, the rear-side support bracket 17 has a tendency to displace in the forward direction together with the outer column 11, however, both of the capsules 21 stay in their original positions together with the bolts. As a result, the capsules 21 come out toward the rear from the notches 20, which allows the steering wheel 1 to displace in the forward direction. A shock-absorbing mechanism that is constructed in this way absorbs the impact energy that is applied to the steering wheel 1 from the driver, and protects the driver.

Moreover, in order to make it possible to adjust the forward-backward position and the up-down position of the steering wheel 1, the outer column 11 is supported by the rear-side support bracket 17 so as to be able to displace in the forward-backward direction and in the up-down direction. More specifically, a column-side bracket 25 that has a pair of held sections 24 that are separated from each other in the width direction are integrally provided on the bottom surface of the front-end section of the outer column 11. Column-side through holes 26 that extend in the forward-backward direction are formed in the held sections 24 at positions that are aligned with each other. Moreover, vehicle-side through holes 27 that extend in the up-down direction are formed in portions of the support-plate sections 18 of the rear-side support bracket 17 that are aligned with each other and that are aligned with part in the forward-backward direction of the column side through holes 26. When the held sections 24 are held by the support-plate sections 18 of the support bracket 17, a rod-shaped member 28 is inserted through the column-side through holes 26 and vehicle-side through holes 27 from one end to the other (from the right side to the left side in FIG. 10), and a connecting nut 29 is screwed on the other end of the rod-shaped member 28. The connecting nut 29 can be freely turned by an adjustment lever 30.

The connecting nut 29 is rotated by the operation of the adjustment lever 30, and by expanding or contracting the space between the connecting nut 29 and the head section of the rod-shaped member 28, it is possible to expand or contact the space between the support-plate sections 18, which fastens or unfastens the outer column 11 to or from the rear-side support bracket 17; and it is possible to expand or contract the space between the held sections 24, which fastens or unfastens the outer column 11 to or from the inner column 10. With this kind of construction, when the space between the connecting nut 29 and the head section 31 is in the expanded state, it is possible to adjust the forward-backward position of the steering wheel 1 by causing the outer column 11 to displace in the forward-backward direction relative to the inner column 10 within the range (telescopic adjustment range) that the rod-shaped member 28 is able to displace inside the column-side through holes 26. Moreover, it is possible to adjust the up-down position of the steering wheel 1 by causing the steering column 4 to pivotally displace around the pivot shaft 16 within the range (tilt adjustment range) that the rod-shaped member 28 is able to displace inside the vehicle-side through holes 27.

On the other hand, FIG. 11 illustrates a conventional tilt steering apparatus that is disclosed in JP 2006-159920 (A) and has a bias spring 32 that applies a pressure force in the upward direction to the steering column 4a. The bias spring 32 is a so-called double-torsion spring that is formed, for example, by bending single wire that is made of spring steel, and is assembled so that a pair of coil-spring sections 33 that are provided on the portions near both ends of the wire are arranged so as to be in front of the rear-side bracket 17a, and by turning the pair of coil-spring sections 33, a tensile force is generated by these coil-spring sections 33 in the direction turned, and in that state, both end sections of the bias spring 32 engage with part of a front-plate section 34 that is provided on the front end of the rear-side support bracket 17a, and a pressure section 35 that is formed by the middle section of the wire causes a pressure force to act in the upward direction on the steering column 4a.

By providing the bias spring 32, when the adjustment lever 30 is operated, the steering column 4a is prevented from pivoting downward due to gravity, and it is also possible to reduce the force needed when adjusting the height position of the steering column 4a. However, when the bias spring 32 is applied as a support mechanism for a steering column 4 in a tilt and telescopic steering apparatus that has the shock-absorbing mechanism illustrated in FIG. 9 and FIG. 10, there is a possibility that during a secondary collision, the bias spring 32 will also displace in the forward direction together with the outer column 11 and rear-side support bracket 17 to which both end sections of the bias spring 32 are fastened, and that the coil-spring sections 33 will collide against a member such as the gear housing 12 of a steering-assist apparatus 5 that is located further toward the front than the bias spring 32, and the bias spring 32 will be prevented from further displacement in the forward direction.

When the rear-side support bracket 17 and outer column 11 try to displace further in the forward direction with the bias spring 32 prevented from further displacement in the forward direction, there is a possibility that unless the fastened state of the bias spring 32 to the rear-side support bracket 17a is released, the bias spring 32 will be stuck between the rear-end section of the gear housing 12 and the rear-side support bracket 17, and will obstruct smooth displacement in the forward direction of the rear-side support bracket 17 and the outer column 11.

Moreover, even when the fastened state of the bias spring 32 to the rear-side support bracket 17 is released during a secondary collision, there is a possibility that as the rear-side support bracket 17 displaces further in the forward direction, the rear-side support bracket 17 and the coil-spring sections 33 will interfere with each other in the forward-backward direction, and will obstruct displacement of the rear-side support bracket 17a in the forward direction, and prevent smooth displacement in the forward direction of the rear-side support bracket 17 and outer column 11. A similar situation also occurs when a shock-absorbing mechanism that allows displacement in the forward direction of the steering column 4a and rear-side support bracket 17 during a secondary collision is applied to the tilt steering apparatus illustrated in FIG. 11.

RELATED LITERATURE

Patent Literature

[Patent Literature 1] JP 2011-218941 (A)
[Patent Literature 2] JP 2006-159920 (A)

SUMMARY OF INVENTION

Problem to be Solved by Invention

The object of the present invention is to provide construction of a tilt steering apparatus that has a shock-absorbing mechanism in which, even when a bias spring is applied that causes a pressure force to act on the steering column in the upward direction, the steering column and support bracket can displace smoothly in the forward direction during a secondary collision without interference from the bias spring.

Means for Solving Problem

The present invention relates to a tilt steering apparatus having a bias spring that is provided so as to span between a steering column and a support bracket, and causes an upward pressure force to act on the steering column, and is characterized in that, during the stroke through which the steering column and the support bracket are able to displace in the forward direction during a secondary collision, when the bias spring displaces in the forward direction with these members and interferes in the forward-backward direction with a member that is located further toward the front than the bias spring, a locked state of the bias spring against the support bracket is released, which allows the steering column and the support bracket to further displace in the forward direction. In the present invention, the stroke is the length though which the steering column is able to contract in the forward-backward direction (axial direction) during a secondary collision in the case of construction that has a telescopic mechanism, or is the length through which the steering column is able to displace in the forward direction during a secondary collision in the case of construction that does not has a telescopic mechanism.

More specifically, the tilt steering apparatus of the present invention has a steering column, a support bracket and a bias spring. The steering column has a front section that is supported by a portion fixed to a vehicle body by way of a pivot shaft that is arranged in the width direction, the steering column being able to pivotally displace around the pivot shaft, and supporting a steering shaft on the inside thereof so as to freely rotate. A steering wheel is supported by and fastened to the rear-end section of this steering shaft. The support bracket has a connecting-plate section that is supported by the vehicle body so as to be able to separate in the forward direction, and a pair of support-plate sections that are fastened to the connecting-plate section so as to be suspended downward, and by expanding or contracting the space between, are capable of a state of holding the steering column from both sides in the width direction, and a state of allowing the pivotal displacement of the steering column.

More specifically, a column-side bracket is provided in part in the axial direction of the steering column. Moreover, vehicle-side through holes are provided in portions of the pair of support-plate sections that are aligned with each other so as to extend in the up-down direction, and a column-side through holes is provided in a portion of the column-side bracket that is aligned with the vehicle-side through holes so as to penetrate through in the width direction of the column-side bracket. In the case of a steering apparatus that has a telescopic mechanism, the column-side through hole extends in the forward-backward direction. A rod-shaped member is provided so as to be inserted in the width direction through the vehicle-side through holes and the column-side through hole, and the rod-shaped member has a mechanism that expands or contracts the space between the pair of support-plate sections. Furthermore, an adjustment lever is provided on the end section of the rod-shaped member, and as the adjustment lever rotates, the mechanism that expands or contracts the space between the pair of support-plate sections operates.

The bias spring is assembled between the steering column and the support bracket so as to be able to displace in the forward direction together with the steering column and the support bracket, and is constructed so as to apply an upward pressure force to the steering column.

Particularly, in the tilt steering apparatus of the present invention, the bias spring has a pair of locking-arm sections and a pressure section. A spring-side locking section is formed in part of each of the pair of locking-arm sections, and the spring-side locking sections are locked with bracket-side locking sections that are formed in the support bracket. The pressure section is directly or indirectly locked with part of the steering column, and causes an upward pressure force to act on the steering column with the spring-side locking sections as a fulcrum. The tilt steering apparatus of the present invention is also constructed so that when the bias spring interferes in the forward-backward direction with a member that is located further toward the front than the bias spring during the stroke through which the steering column and the support bracket are able to displace in the forward direction during a secondary collision, the locked state between the spring-side locking sections and the bracket-side locking sections is released, the bias spring stops in that place and does not displace in the forward direction, and the steering column and support bracket are allowed to further displace in the forward direction.

Preferably, the tilt steering apparatus of the present invention is constructed so that, when the locked state of the spring-side locking sections against the bracket-side locking sections is released and the steering column and the support bracket displace further in the forward direction, there is no interference in the forward-backward direction between the bias spring and the support bracket.

Preferably, the bias spring is made of a single wire and has a pair of coil-spring sections, wherein the pressure section is formed by bending the middle section of the wire, and the pair of coil-spring sections are formed by winding the portions near both ends of the wire into a spiral shape, and so as to be separated from each other in the width direction; the pair of locking-arm sections are formed from both end sections of the wire in a state so as to extend toward the rear from the end sections on the opposite side from the pair of coil-spring sections, and the bracket-side locking sections are provided on the side surfaces in the width direction of the pair of support-plate sections.

In this case, preferably, the pair of coil-spring sections are located further toward the front than the pair of support-plate sections and do not overlap the pair of support-plate sections in the forward-backward direction, and are located in positions that are aligned in the width direction with the pair of locking-arm sections.

Moreover, preferably, the pair of coil-spring sections and the pair of locking-arm sections are located further on the outside in the width direction than the pair of support-plate sections, and the bracket-side locking sections are provided on the outside surfaces in the width direction of the pair of support-plate sections.

The tilt steering apparatus of the present invention preferably further has a guiding member that is supported by the portion fixed to the vehicle body, and guides the support bracket in the forward direction while preventing the support bracket from dropping. In this case, spring-side guiding sections that are parallel or nearly parallel on the top and bottom with respect to the direction that the guiding member guides the support bracket are provided in the portions of the pair of locking-arm sections that come in sliding contact with the bracket-side locking sections during a secondary collision.

In the tilt steering apparatus of the present invention, preferably a coating layer made of a low-friction material is formed on the spring-side locking sections. Alternatively, grease is preferably applied to the engaging portions between the spring-side locking sections and the bracket-side locking sections.

Effect of Invention

With the tilt steering apparatus of the present invention, it is possible to allow the steering column and support bracket to displace smoothly in the forward direction during a secondary collision. In other words, in the present invention, during a secondary collision, when the bias spring that displaces in the forward direction together with the steering column and support bracket interferes with another member in the forward-backward direction, the locked state between the spring-side locking sections of the bias spring and the bracket-side locking sections of the support bracket is released. Therefore, during the stroke through which the steering column and support bracket are able to displace in the forward direction, the bias spring does not stick in between another member and the support bracket. As a result, the steering column and the support bracket are allowed to smoothly displace during a secondary collision.

Moreover, in the tilt steering apparatus of the present invention, by employing construction in which there is no interference in the forward-backward direction between the bias spring and the support bracket when the locked state between the bias spring and the support bracket is released and the steering column and the support bracket further displace in the forward direction, it becomes possible to maintain a large stroke during a secondary collision, and it is possible to allow the steering column and the support bracket to smoothly displace over that entire stroke.

MODES FOR CARRYING OUT INVENTION

Figure 1:
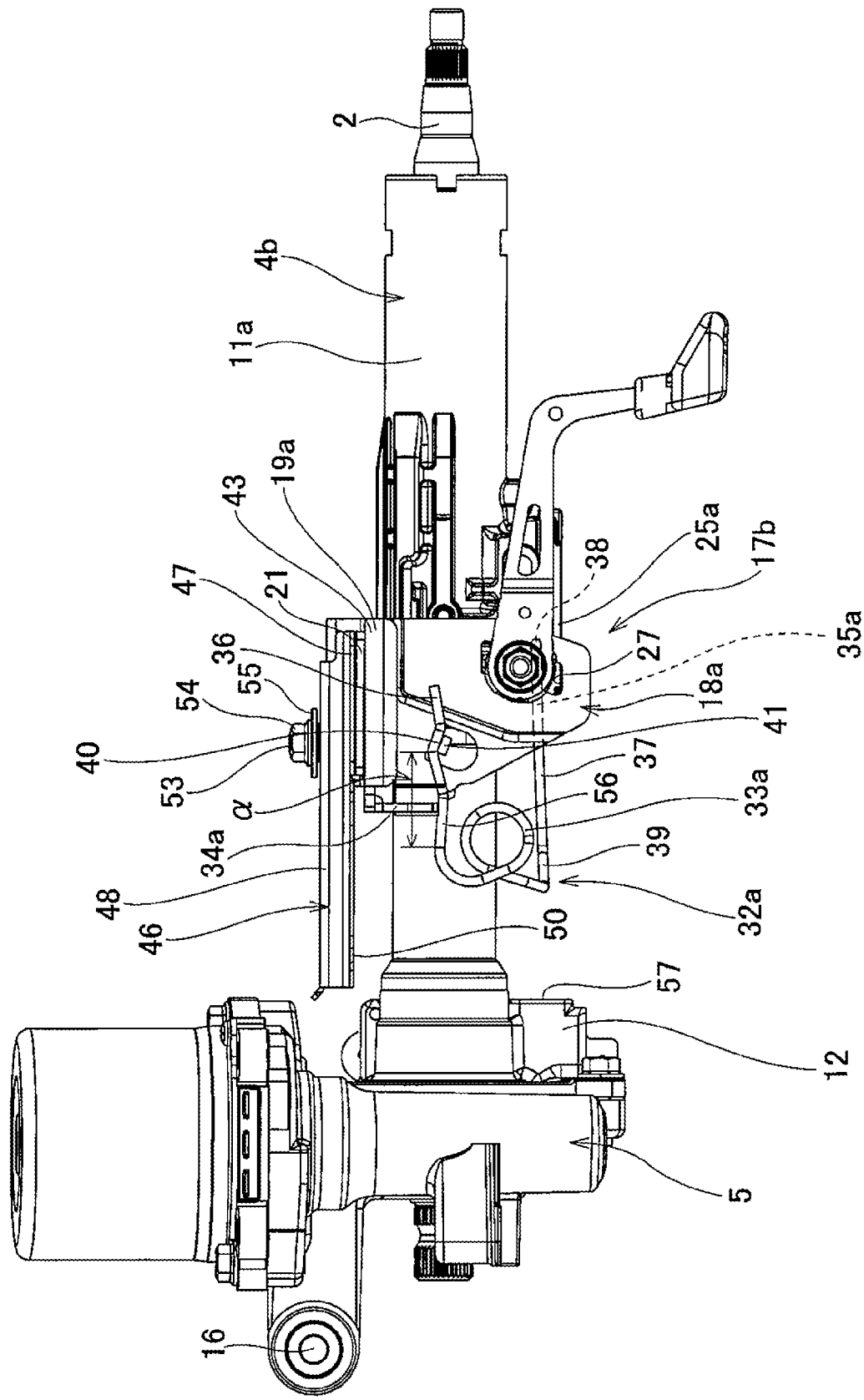
FIG. 1 illustrates a side view of a tilt and telescopic steering apparatus of an example of an embodiment of the present invention in the normal state.

FIG. 1 to FIG. 7 illustrate an example of an embodiment of the present invention. In this example, the present invention is applied to a tilt and telescopic steering apparatus that makes it possible to adjust both the height position and the forward-backward position of a steering wheel. More specifically, the tilt and telescopic steering apparatus of this example has: a steering column 4*b* that is formed by combining an inner column 10 that is located on the front side with an outer column 11*a* that is located on the rear side; a support bracket 17*b* that is supported by the vehicle body 15 so as to be able to separate in the forward direction, and has a pair of support-plate sections 18*a* that are formed so as to be located on both sides in the width direction of the steering column 4*b*; and a bias spring 32*a* that is installed between the steering column 4*b* and support bracket 17*b* in a state so as to be able to displace in the forward direction with the steering column 4*b* and support bracket 17*b*, and applies an upward pressure force to the steering column 4*b*.

The steering column 4*b* has a front section that is supported by a portion fixed to the vehicle body by way of a pivot shaft 16 that is arranged in the width direction, and is able to pivotally displace around the pivot shaft 16; and supports the steering shaft 2 on the inside thereof, the steering wheel 1 being supported by and fastened to the rear-end section of the steering shaft 2. In construction in which the front section of the steering column 4*b* is supported by a portion that is fastened to the vehicle body by way of a front-side support bracket 14 (see FIG, 9) so as to be able to pivotally displace, the support bracket 17*b* corresponds to a so-called rear-side support bracket.

A column-side bracket 25*a* is provided in part in the axial direction of the outer column 11*a* of the steering column 4*b*. Moreover, vehicle-side through holes 27 that extend in the up-down direction are provided in portions of the pair of support-plate sections 18*a* that are aligned with each other, and a column-side through hole 26 that extends in the forward-backward direction is provided so as to penetrate in the width direction through a portion of the column-side bracket 25*a* that is aligned with the vehicle-side through holes 27. A rod-shaped member 28 is provided so as to be inserted in the width direction through the vehicle-side through holes 27 and the column-side through hole 26, and the rod-shaped member 28 has a mechanism for expanding or contracting the space between the pair of support-plate sections 18*a*. In addition to a mechanism that has a head section of the rod-shaped member 28 and a nut that screws on the tip-end section of the rod-shaped member 28, it is possible to also employ a mechanism that uses a cam apparatus as this kind of mechanism. An adjustment lever 30 is provided on the end section of the rod-shaped member 28, and as the adjustment lever 30 rotates, the mechanism that expands or contracts the space between the pair of support-plate sections 18*a* operates and switches between a state in which the outer column 11*a* of the steering column 4*b* is held on both sides in the width direction, and a state in which the steering column 4*b* is able to pivotally displace.

A feature of this example is devising the shape and support mechanism of a bias spring 32*a* of a tilt and telescopic steering apparatus with a shock-absorbing mechanism that causes an upward pressure force to act on the steering column 4*b*. Except for the feature of this example, the construction of the tilt and telescopic steering apparatus is the same as the conventional construction, so an explanation of that construction will be omitted or simplified, and the explanation below will center on the feature of this example.

The support bracket 17*b* of the tilt and telescopic steering apparatus of this example has a pair of left and right support-plate sections 18*a* that are provided underneath an upper bracket 43. The upper bracket 43 is one plate-shaped member that extends in the width direction, and has a pair of left and right connecting-plate sections 19*a*, and a continuous-plate section 44 that is provided in the width direction between the connecting-plate sections 19*a*. The continuous-plate section 44 protrudes further upward than the connecting-plate sections 19*a* on both sides, and connects the inside ends in the width direction of the connecting-plate sections 19*a*. Moreover, a guided-side through hole 45 that penetrates through the continuous-plate section 44 in the up-down direction is formed in a portion near the rear end of the center section in the width direction of the continuous-plate section 44.

The top-end sections of the pair of support-plate sections 18*a* are connected and fastened to the bottom surface of the continuous sections between the pair of connecting-plate sections 19*a* and the continuous-plate section 44 by a method such as welding or the like. Locking tabs 41 that are formed by bending part outward in the width direction are provided in portions near the frond ends of the middle sections in the up-down direction of the support-plate sections 18*a*. The locking pieces 41 correspond to the bracket-side locking sections of the present invention. The construction of the bracket-side locking sections is not limited to locking tabs 41, and it is also possible to employ other arbitrary locking construction such as protrusions for the bracket-side locking sections. Moreover, in this example, the length dimension in the up-down direction of a pair of front-plate sections 34*a* of the support bracket 17*b* is small, and the position of the edge on the bottom end of the front-plate sections 34*a* is located further upward than that of the conventional construction. As a result, together with preventing interference in the forward-backward direction between these front-plate sections 34*a* and the bias spring 32*a*, it is possible to improve the ability of assembling the bias spring 32*a* with respect to the support bracket 17*b*.

In this example, a guiding member 46 that guides the displacement in the forward direction of the support bracket 17*b* while preventing the support bracket 17*b* from dropping during a secondary collision is provided between the vehicle body 15 and the top surface of the upper bracket 43 of the support bracket 17*b*. The guiding member 46 is a single plate-shaped member that is long in the width direction, and has a pair of left and right fastening-plate sections 47 and a guiding-plate section 48 that is provided in the center section in the width direction. Fastening through holes 49 that penetrate in the up-down direction through the fastening-plate sections 47 are formed in the center sections of the fastening-plate sections 47. Moreover, a pair of fastening-flange sections 50 is formed on both sides in the width direction of the front-end sections of these fastening-plate sections 47 so as to protrude outward in the width direction. Small fastening-side through holes 51 that penetrate in the up-down direction though the fastening-flange sections 50 are formed in these fastening-flange sections 50.

The guiding-plate section 48 protrudes further upward than the fastening-plate sections 47 on both sides, and connects the inside ends in the width direction of the fastening-plate sections 47. In other words, the guiding member 46 has a shape that follows the top surface of the upper bracket 43. Moreover, a long guiding-side hole 52 having a width dimension that is a little larger than the diameter of the guided-side through hole 45 and that extends in forward-backward direction is formed at a position in the center section in the width direction of the guiding-plate section 48 that in the assembled state is aligned in the width direction and forward-backward direction with the guided-side through hole 45 of the continuous-plate section 44 of the upper bracket 43.

The guiding member 46 is placed above the upper bracket 43 in which the capsules 21 are assembled, and with the fastening through holes 49 of the fastening-plate sections 47 aligned with the through holes 23 in the up-down direction of the capsules 21, the guiding member 46 is fastened to the vehicle body 15 by bolts (not illustrated in the figure) for fastening the capsules 21 to the vehicle body. Moreover, the front-end section of the guiding member 46 is connected and fastened to the vehicle body 15 by bolts (not illustrated in the figure) that pass downward through the small fastening-side trough holes 51 of the fastening-flange sections 50. Therefore, the guiding member 46 is prevented from displacement in the forward-backward direction with respect to the vehicle body 15 during a secondary collision. In this way, when the guiding member 46 is connected and fastened to the vehicle body 15, the guided-side through hole 45 of the continuous-plate section 44 and the rear-end section in the forward-backward direction of the long guiding-side hole 52 of the guiding member 46 are aligned.

Together with inserting the shaft section of a bolt 53, the head section thereof being located under the continuous-plate section 44, through the guided-side though hole 45 and the long guiding-side through hole 52, a nut 54 is screwed onto a male screw section that is formed on a portion of that shaft section that protrudes further upward than the guiding-plate section 48. In this state, the continuous-plate section 44 and guiding-plate section 48 are not firmly held between the head section of the bolt 53 and the nut 54, and are connected so that the upper bracket 43 is able to displace in the forward-backward direction with respect to the guiding member 46. In other words, with the guiding member 46 and the support bracket 17b in a connected state, the support bracket 17b is supported in a suspended state by the guiding member 46, and displacement in the forward-backward direction is guided by the guiding member 46. In this example, a sliding plate 55 is provided between the top surface of the continuous-plate section 44 of the support bracket 17b and the bottom surface of the nut 54, so that the portion of the shaft section of the bolt 53 that protrudes further upward than the guiding-plate section 48 is inserted into a through hole that is formed in the center of the sliding plate 55. As a result, the support bracket 17b is more smoothly guided in the forward-backward direction by the guiding member 46. The construction for guiding the support bracket 17b by the guiding member 46 is not limited to the construction of this example, and it is also possible to employ various kinds of known construction in which the support bracket is guided by the guiding member by direct or indirect interaction between the guiding member that is fastened to the vehicle body and the support bracket.

The bias spring 32a of the tilt and telescopic steering apparatus of this example spans between the outer column 11a of the steering column 4b and the support bracket 17b, and in the assembled state, applies an upward pressure force on the outer column 11a of the steering column 4b, and balances the weight of the steering column 4b and the member that rises together with the steering column 4b. The bias spring 32a in this example has so-called double-torsion spring construction, and is constructed by a single wire made of spring steel, and has: a pair of coil-spring sections 33a, a pressure section 35a that is provided in the portion between the coil-spring sections 33a in the width direction, and a pair of locking-arm sections 36. However, the bias spring of the present invention is not limited to the construction of this example, and it is also possible to employ a spring having arbitrary construction in which two torsion springs or the like span between the steering column 4b and the support bracket 17b and achieve the feature of the present invention.

The coil-spring sections 33a are formed by winding the portions near both ends of the wire material into a spiral shape, so as to be concentric with each other and separated from each other in the width direction. The pressure section 35a is formed by performing a bending process on the middle section of the wire material and bending that middle section back into a U shape so that the pressure section 35a has a pair of straight sections 37 that are parallel with each other, and an arc-shaped first connecting section 38 that connects together the rear-end sections of these straight sections 37. The front-end sections of the pair of straight sections 37 and the end sections on the sides of the coil-spring sections 33a on both sides that face each other are connected by a second connecting section 39. In the assembled state, the portion of the second connecting section 39 that is located in front of the support-plate sections 18a (portion near the outside end in the width direction) is preferably located toward the front as far as possible. In doing so, the second connecting section 39 does not obstruct displacement in the forward direction of the support bracket 17b during a secondary collision.

Moreover, the pair of locking arm sections 36a are formed from both end sections of the wire material such that the overall length is long in the forward-backward direction, and so as to have a straight shape as seen in the up-down direction, and to have a zig-zag shape (triangular wave shape) as seen from the side. Moreover, L-shaped spring-side locking sections 40 are formed by bending the portions near the rear ends of the locking arm sections 36 so that the wire material protrudes upward a little (so that the bending angle forms an obtuse angle).

In this example, the portions of the pair of locking arm sections 36 that come in sliding contact with the locking tabs 41 during a secondary collision, or in other words, the portions (portions indicated by α in FIG. 1) from the front ends of the spring-side locking sections 40 to the positions that are aligned with the locking tabs 41 in the forward-backward direction when the steering column 4b and support bracket 17b have fully displaced in the forward direction (state illustrated in FIG. 5) function as spring-side guiding sections 56 that are arranged vertically in parallel or nearly in parallel with respect to the direction that the guiding member 46 guides the support bracket 17b (forward-backward direction). In other words, the spring-side guiding sections 56 are arranged vertically in parallel or nearly in parallel with respect to the top surface of the guiding-plate section 48. In the case of forming a zig-zag shape with plural straight sections that are inclined a little (two in this example) with respect to the top surface of the guiding-plate section 48 as in this example, the pair of locking-arm sections 36 are arranged so that the average values of incline of these straight sections become vertically in parallel or nearly in parallel with respect to the direction that the guiding member 46 guides the support bracket 17b. Alternatively, in the case where the spring-side guiding sections 56 are formed into an overall wave shape with gentle curves, the pair of locking-arm sections 36 are arranged so that the virtual lines found by linear approximation become vertically in parallel or nearly in parallel with respect to the direction that the guiding member 46 guides the support bracket 17b. The front-end sections of these locking-arm sections 36 are connected to the end sections on the opposite side of the pair of coil-spring sections 3a so that the locking-arm sections 36 extend toward the rear from these end sections. Moreover, these coil-spring sections 33a and locking-arm sections 36 are formed at positions that are nearly aligned in the width direction. In other words, the coil-spring sections 33a and locking-arm sections 36 are provided in a state so as to be nearly overlapping in the forward-backward direction. It is also possible to provide these locking-arm sections 36 further outward in the width direction than the coil-spring sections 33a.

In this example, the bias spring 32a is completely covered by a coating layer of a low-friction material. This low-friction coating layer can be formed by various kinds of surface processing such as PTFE (polytetrafluoroethylene) coating, fluorine coating, molybdenum disulfide coating, zinc phosphate film processing or the like. This coating layer can be formed over the entire bias spring 32a as in this example, or can also be formed on only the portion of the bias spring 32a that comes in contact with the support bracket 17b, outer column 11a of the steering column 4b, or other surrounding members such as the rod-shaped member 28. By limiting the portion where the coating layer is formed in this way, it is possible to keep down the processing cost for forming this coating layer.

This kind of bias spring 32a is arranged so that the coil-spring sections 33a are further on the front side than the support bracket 17b, and by turning these coil-spring sections 33a, a tensile force in the turning direction is generated by these coil-spring sections 33a, and in this state, the half on the rear side of the spring-side locking sections 40 of the locking-arm sections 36 are locked with the top surface of the locking tabs 41 of the support bracket 17b, and the pressure section 35a engages with a receiving surface 42 that is provided on the bottom surface of the center section in the axial direction of the rod-shaped member 28. In this state, the bias spring 32a applies a tensile force in the upward direction on the outer column 11a by way of the rod-shaped member 28. The pressure section 35a is prevented from relative displacement in the forward-backward direction by just the friction force that acts between the pressure section 35a and the receiving surface 42, and except for this, there is no special construction provided for suppressing relative displacement of the pressure section 35a in the forward-backward direction. Moreover, the receiving surface 42 could also be provided on the bottom end of the outer column 11a.

Furthermore, in this example, grease is applied to both the locking portion between the spring-side locking sections 40 of the pair of locking-arm sections 36 and the locking tabs 41 of the support bracket 17b, and the area of contact between the pressure section 35a and the receiving surface 42 of the rod-shaped member 28. Taking into consideration lubrication and viscosity, an arbitrary type of grease can be suitably used as the grease, however, preferably a grease that has little dripping and scattering, prevents rust, can be used over a long period of time, and can be used in areas having wide range of operating temperatures should be used.

In the assembled state, the locking-arm sections 36 and the coil-spring sections 33a that are located on both sides of the bias spring 32a are located on the outside in the width direction of the pair of support-plate sections 18a of the support bracket 17b. In other words, the locking-arm sections 36 and coil-spring sections 33a are located at positions that do not overlap the support-plate sections 18a in the forward-backward direction. Moreover, the pressure section 35a of the bias spring 32a is located in the portion between the support-plate sections 18a in the width direction. Therefore, only the portion near the outside end in the width direction of the second connecting section 39 of the bias spring 32a is located in front of the support-plate sections 18a.

In the assembled state, the bias spring 32a presses the locking tabs 41 downward by way of the spring-side locking sections 40. The bias spring 32a also causes a pressure force to act upward on the outer column 11a of the steering column 4b with the locking portions between the spring-side locking sections 40 and locking tabs 41 on both sides as fulcrums. This balances the pressure force (force that causes the steering column 4b to pivot upward around the pivot shaft 16), and the weight (force=moment that is trying to cause the steering column 4b to pivot downward), and makes it possible during adjustment of the height of the steering wheel 1 to reduce the force necessary for causing the steering column 4b to pivot around the pivot shaft 16. The spring-side locking sections 40 and locking tabs 41 engage with a locking force that keeps the bias spring 32a from shifting in the forward-backward direction when performing operation to adjust the height position and forward-backward position of the steering wheel 1.

Figure 2:
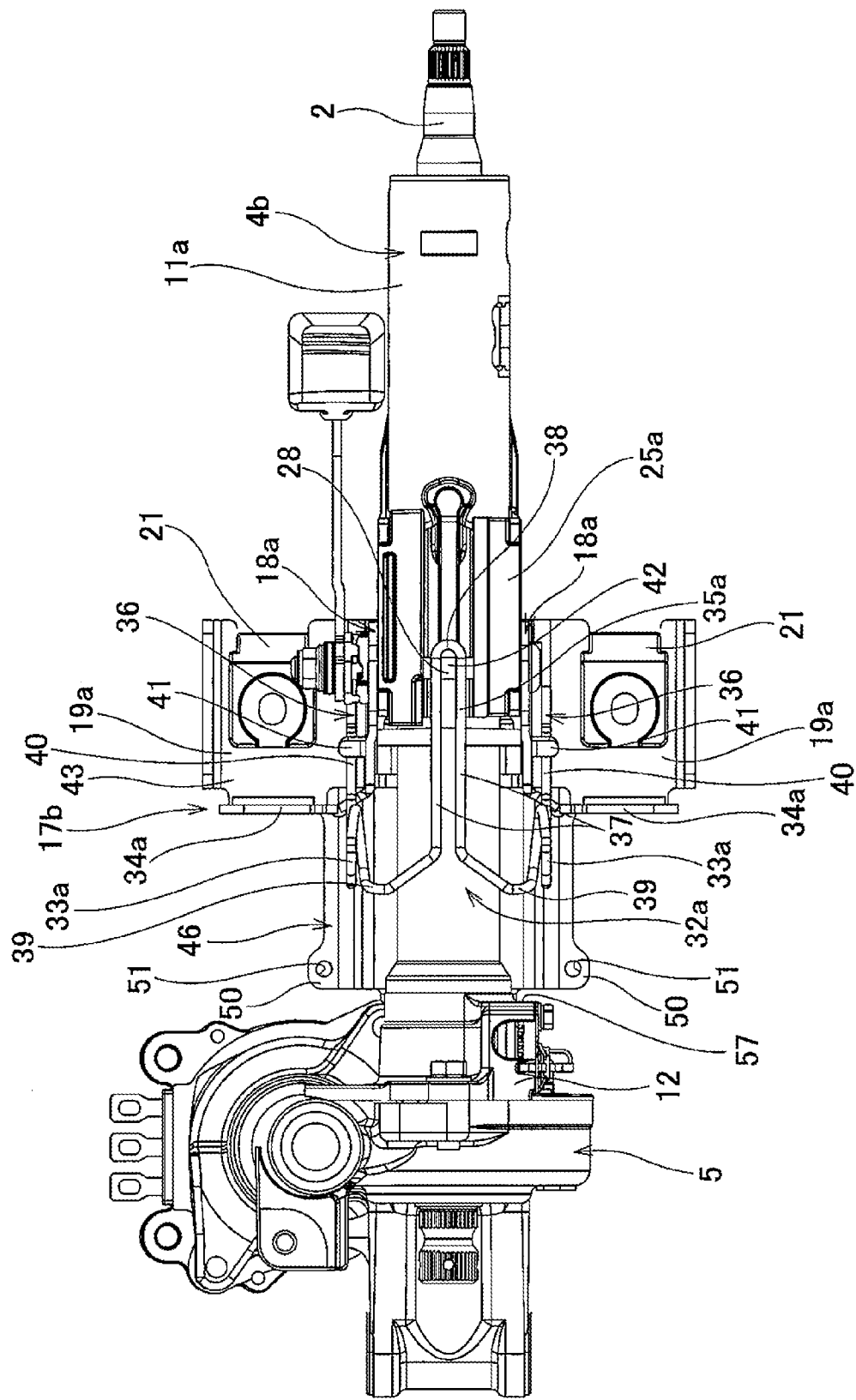
FIG. 2 is a bottom view as seen from the bottom in FIG. 1.

The tilt steering apparatus of this example is such that when the body of a driver collides with the steering wheel 1 during a secondary collision that occurs during a collision accident, the outer column 11a and support bracket 17b are allowed to displace in the forward direction from the normal position illustrated in FIG. 1 and FIG. 2 while the guiding member 46 and pair of left and right capsules 21 remain in place fastened to the vehicle body 15. When this happens, the guiding member 46 prevents the support bracket 17b from falling, and guides the displacement of the support bracket 17b in the forward direction. Therefore, during a secondary collision, the support bracket 17b separates from the vehicle body 15 displaces in the forward direction along the guiding member 46, and even as the secondary collision proceeds, the support bracket 17b will not drop. Therefore, during a secondary collision, regardless of the direction of the force that is applied to the steering wheel from the driver, the support bracket 17b stably displaces in the forward direction. Moreover, the bias spring 32a does not become disconnected due to impact caused by the support bracket 17b dropping, so the bias spring 32a also smoothly displaces in the forward direction together with the outer column 11a and support bracket 17b.

Figure 3:
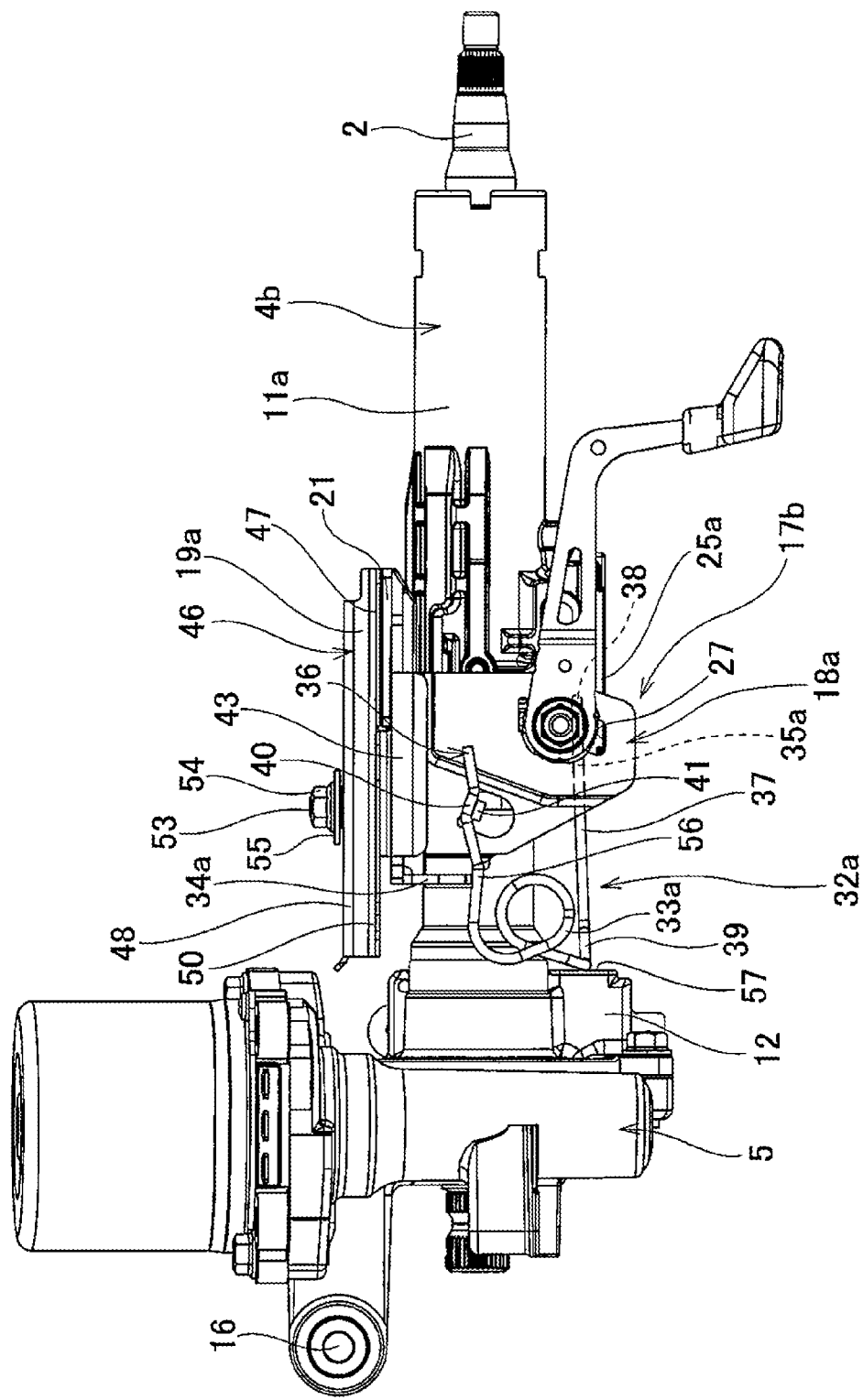
FIG. 3 is a side view of the apparatus illustrated in FIG. 1 in the state in which the outer column and support bracket are in the progress of displacing in the forward direction during a secondary collision.
Figure 4:
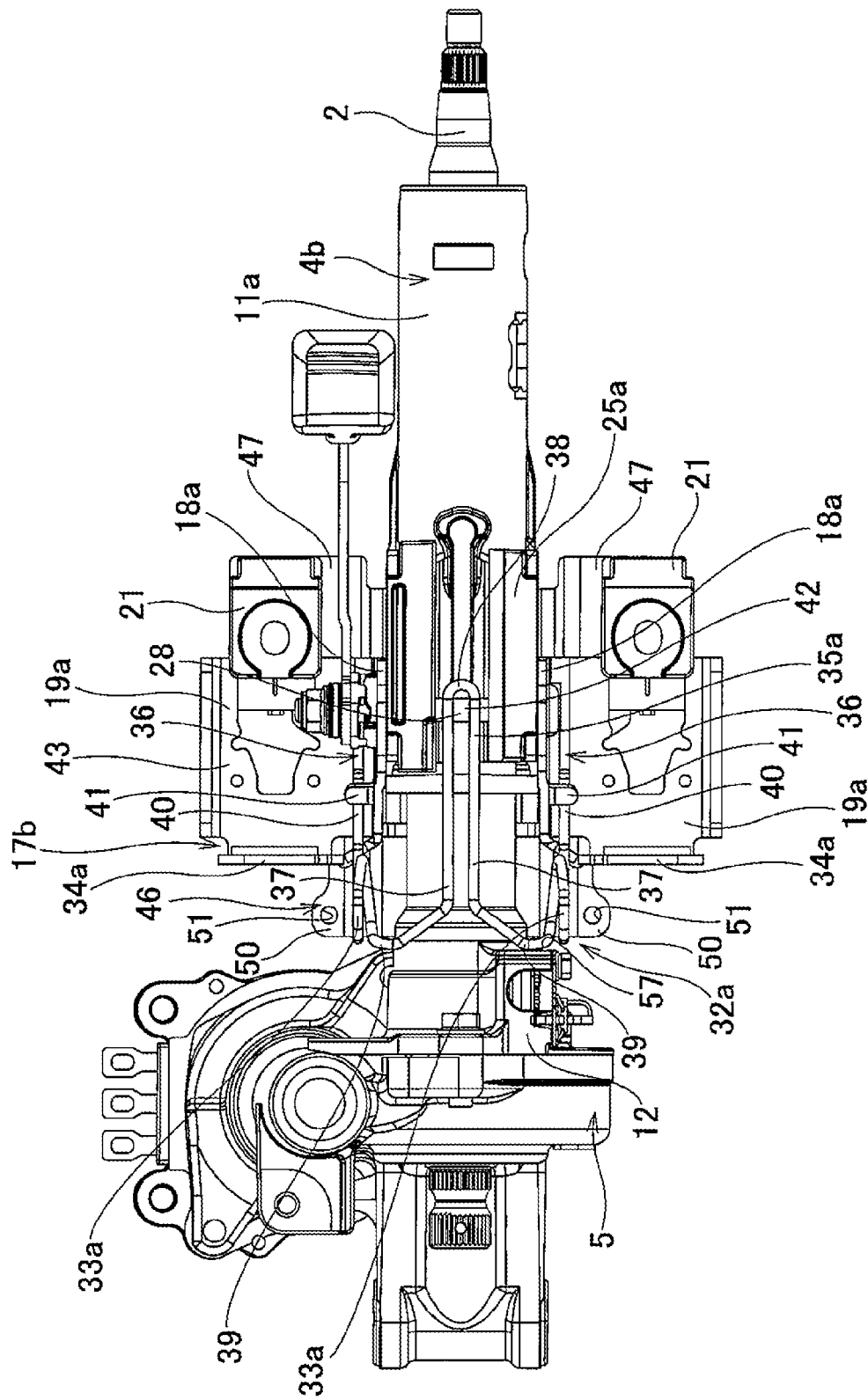
FIG. 4 is a bottom view as seen from the bottom in FIG. 3.

As illustrated in FIG. 3 and FIG. 4, in the middle of the stroke in which the outer column 11a and support bracket 17b can displace in the forward direction, the portion near an outside end in the width direction of one of the second connecting sections 39 of the bias spring 32a (second connecting section at the bottom of FIG. 4) comes in contact with a receiving surface 57 that is provided on the rear-end section of the gear housing 12 of the steering-assist apparatus 5, which is a member that is located further in front of the bias spring 32a, and the bias spring 32a is prevented from further displacement in the forward direction.

In this example, of the rear-end section of the gear housing 12, the receiving surface 57 that comes in contact with the one second connecting section 39 is provided on a virtual plane that is orthogonal to the direction of displacement (forward-backward direction) of the support bracket 17b. By providing a receiving surface 57 in this way, it is possible to stabilize the posture of the bias spring 32a during a secondary collision after the front-end section of the bias spring 32a (front-end section of the one second connecting section 39) comes in contact with the receiving surface 57. Moreover, in this example, the receiving surface 57 of the gear housing 12 is provided so as to only come in contact with the one second connecting section 39, however, it is also possible to provide a receiving surface of the gear housing so as to come in contact with both second connecting sections 39. With such construction, it is possible to further stabilize the posture of the bias spring 32 during a secondary collision after the front-end section of the bias spring 32a (front-end sections of both second connecting sections 39) comes in contact with the receiving surface 57.

Figure 5:
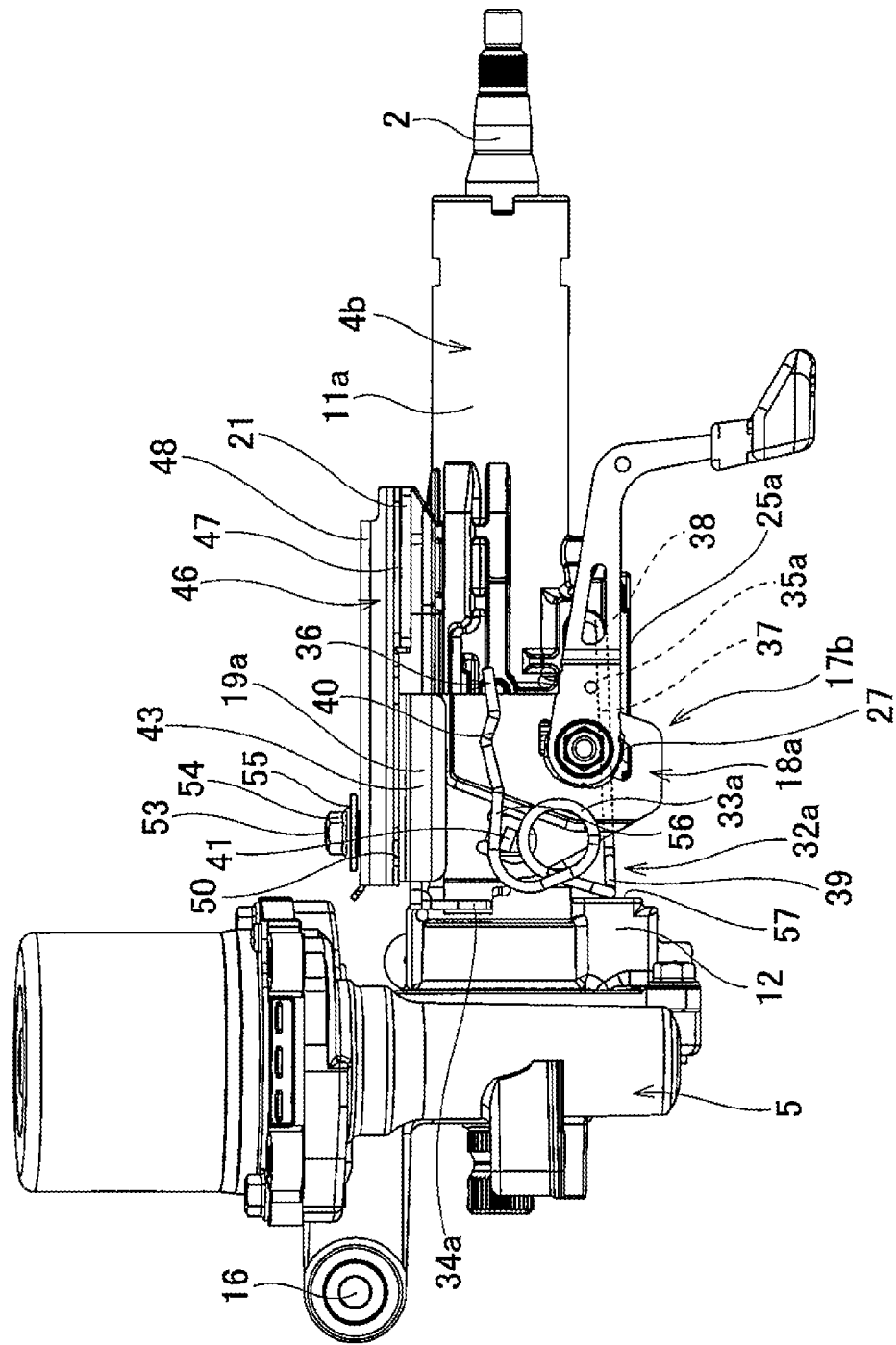
FIG. 5 is a side view of the apparatus illustrated in FIG. 1 in the state in which the outer column and support bracket have displaced all the way in the forward direction during a secondary collision.
Figure 6:
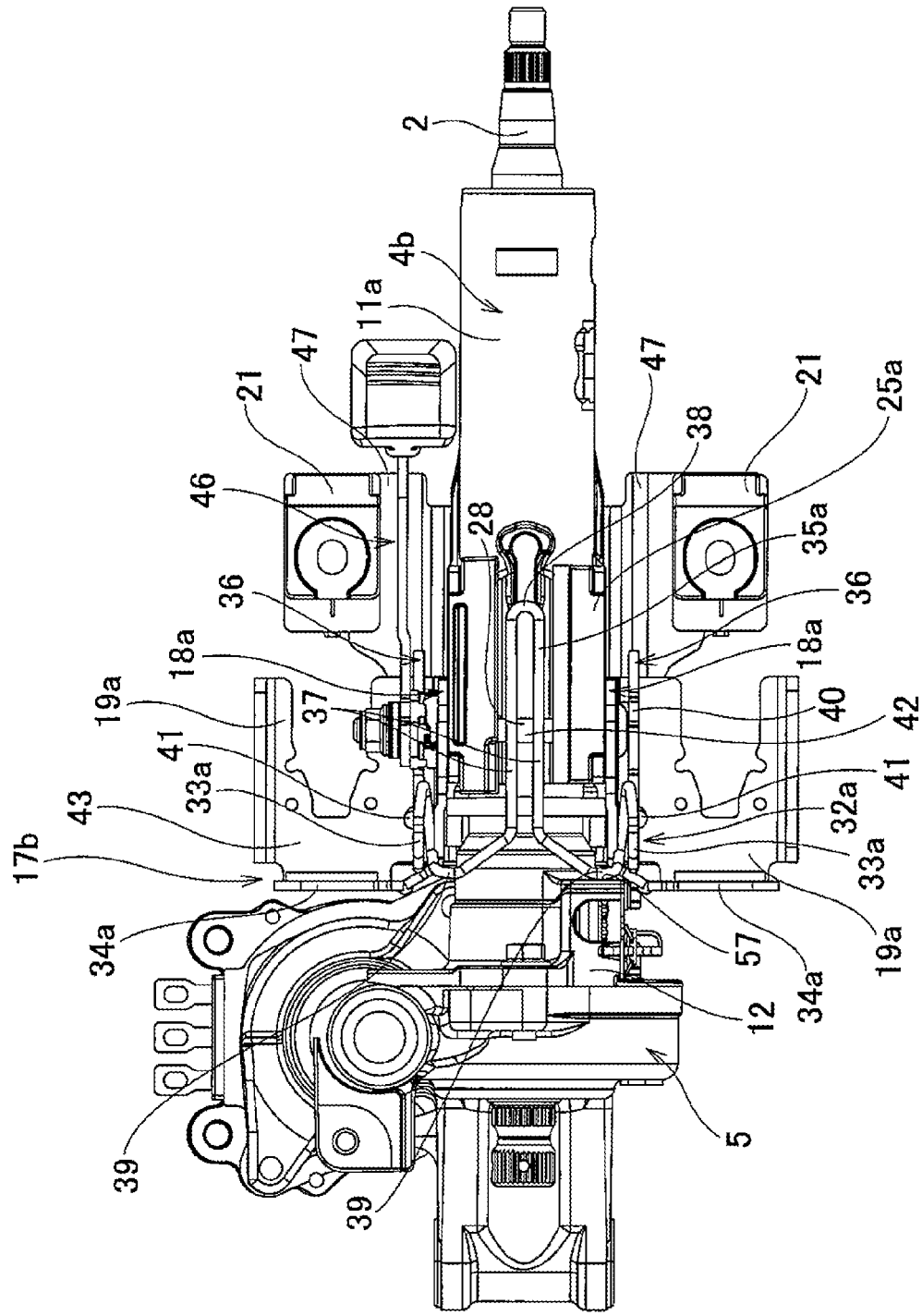
FIG. 6 is a bottom view as seen from the bottom in FIG. 5.
Figure 7:
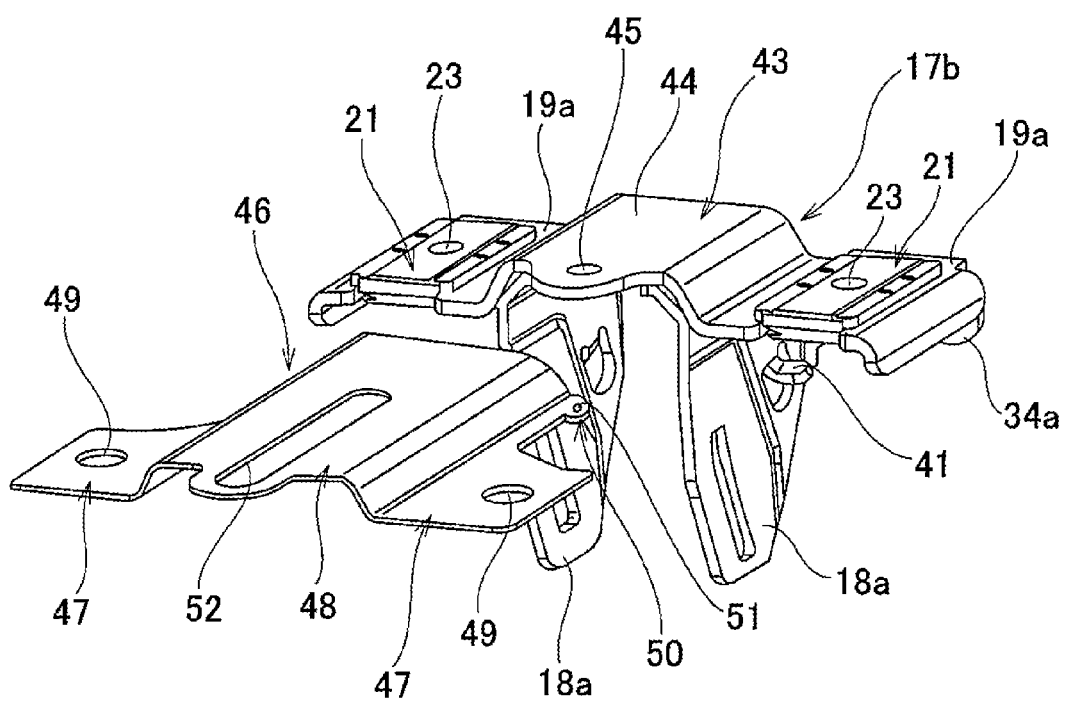
FIG. 7 is a perspective view of the support bracket, capsule and guide member that have been removed from the apparatus illustrated in FIG. 1 as seen at an angle from the rear.
Figure 8:
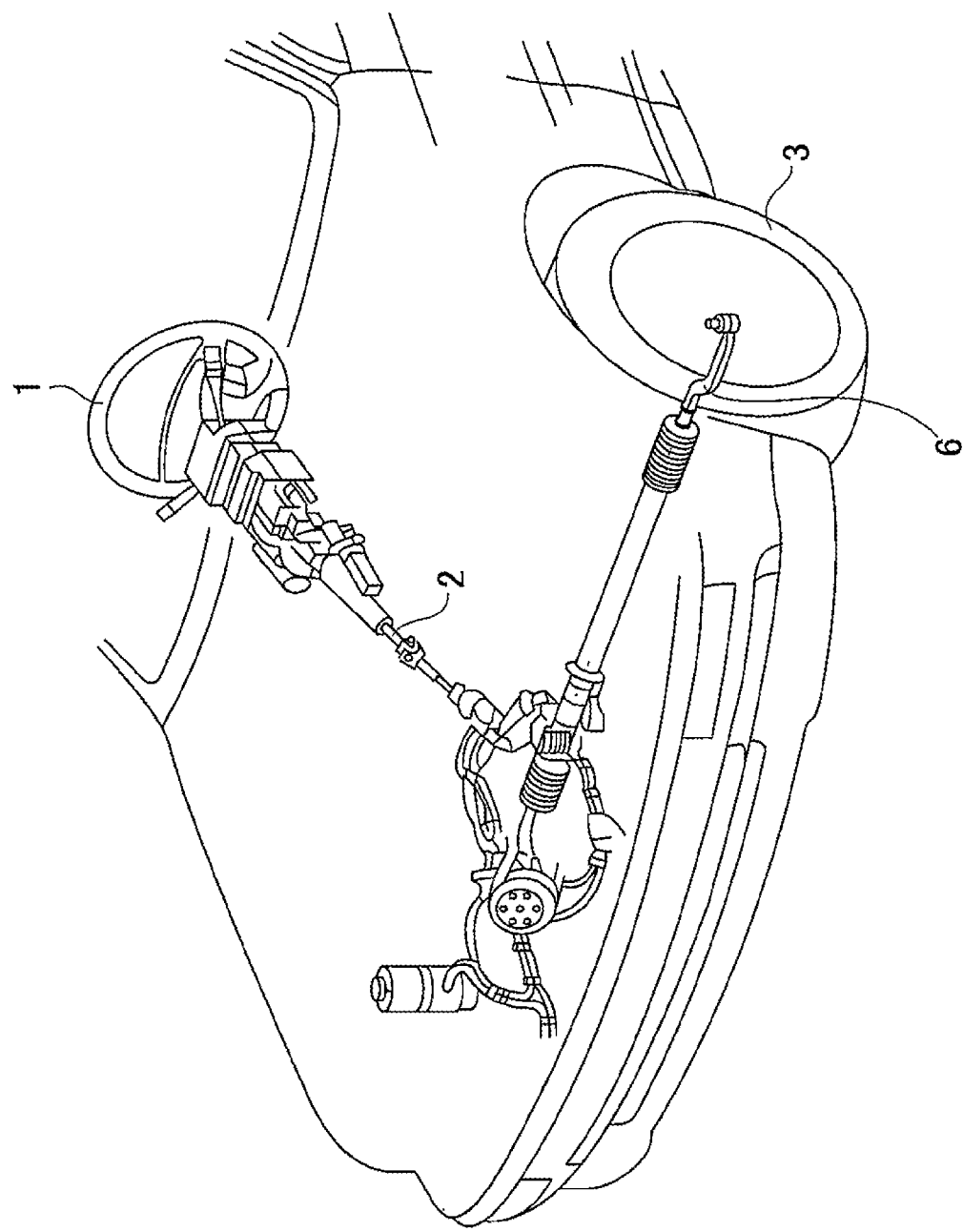
FIG. 8 is a perspective view illustrating an example of a steering apparatus.
Figure 9:
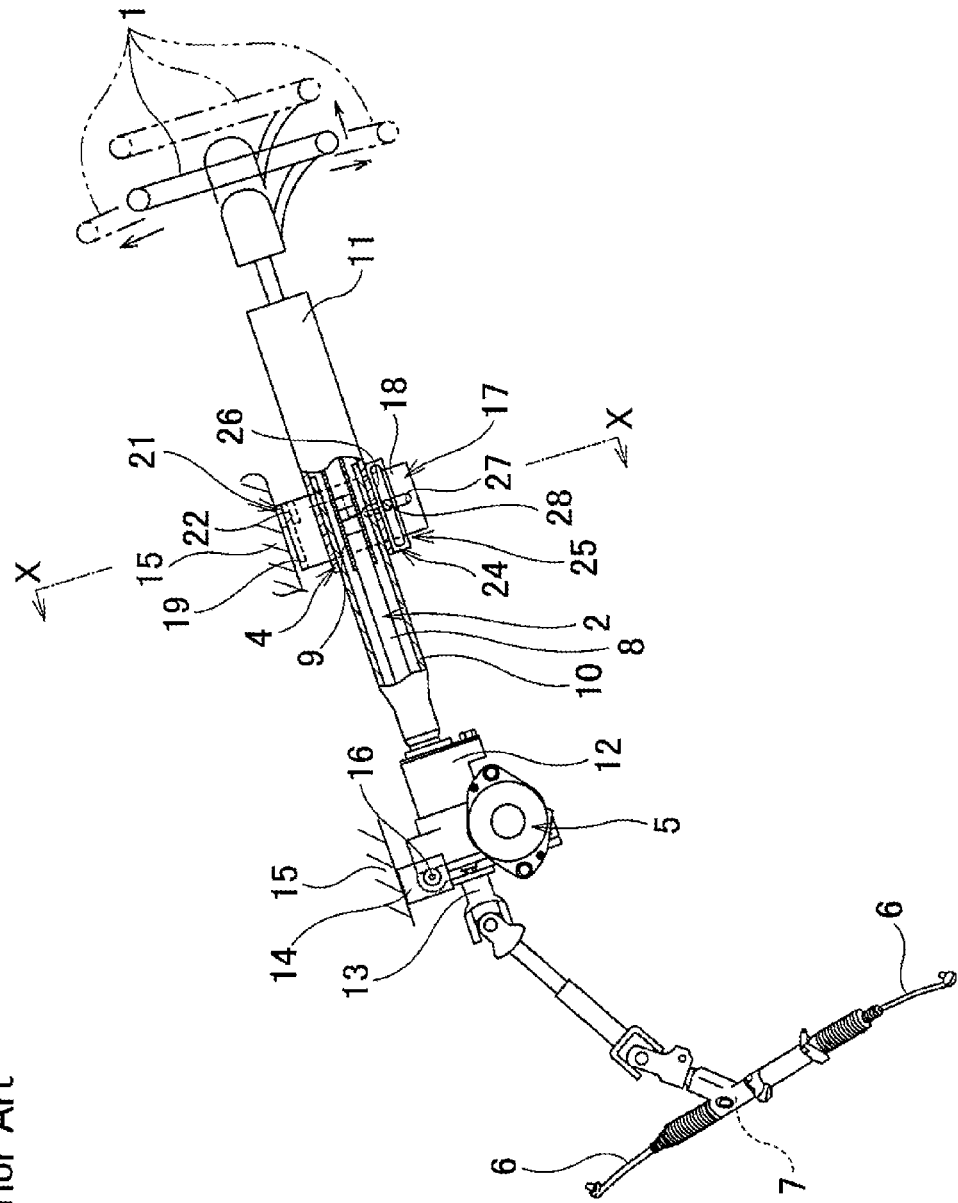
FIG. 9 is a partial cross-sectional side view illustrating an example of a conventional tilt and telescopic steering apparatus.
Figure 10:
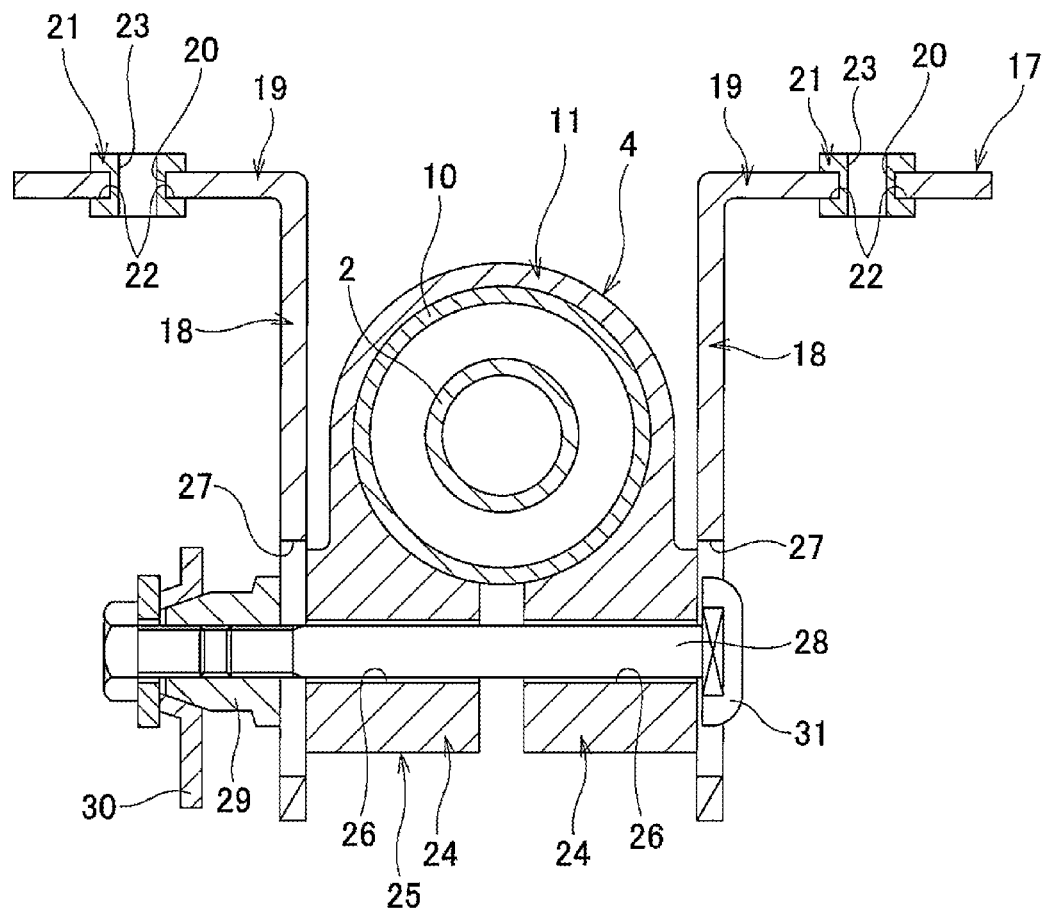
FIG. 10 is a cross-sectional view of section X-X in FIG. 9.
Figure 11:
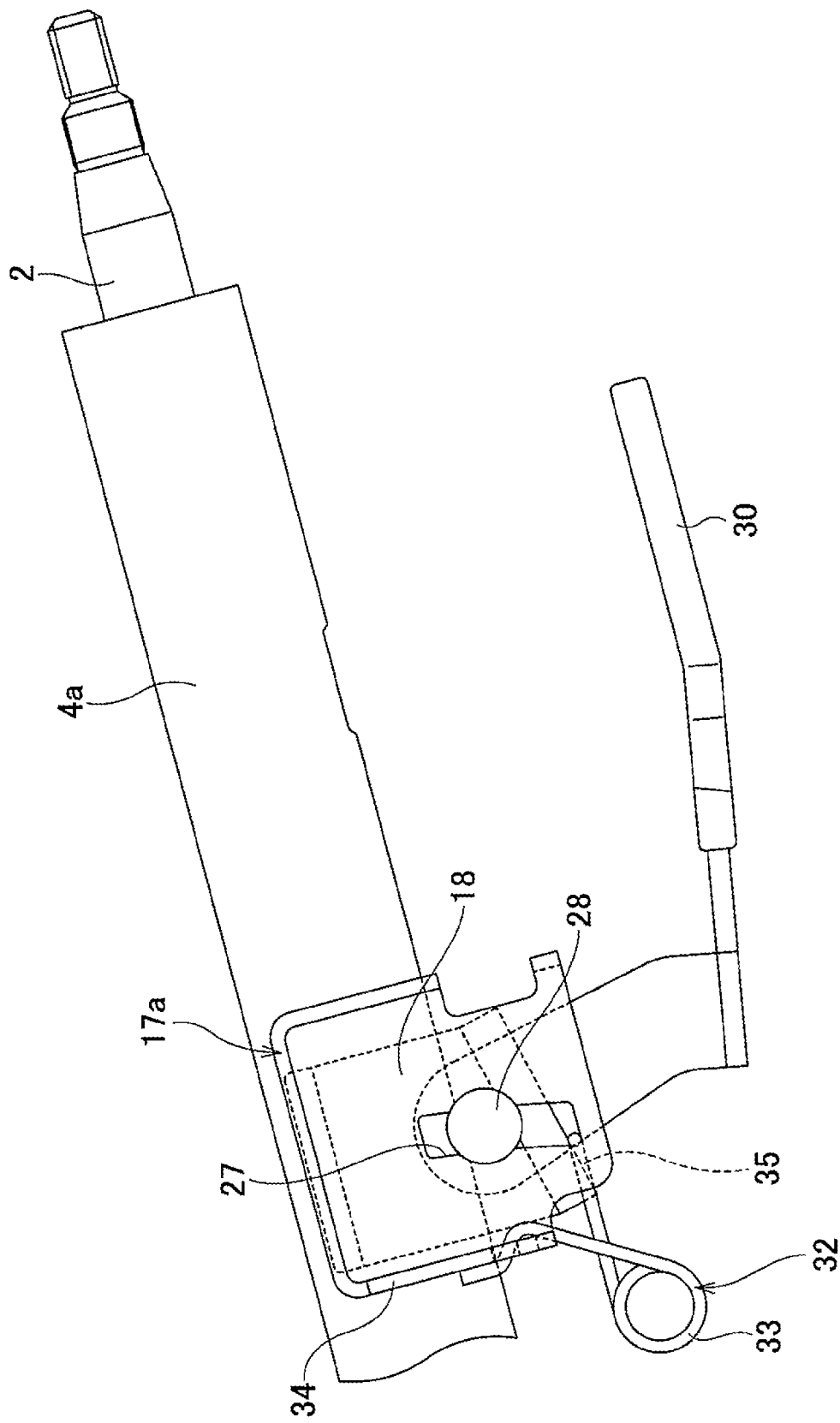
FIG. 11 is a side view illustrating an example of a tilt steering apparatus that has a conventional bias spring.

On the other hand, a force acts trying to further cause the outer column 11a and support bracket 17b to displace in the forward direction. In a state in which the engagement between the spring-side locking sections 40 of the bias spring 32a and the locking tabs 41 of the support bracket 17b becomes disengaged, the bias spring 32a stops at that place, and in that state, the outer column 11a and support bracket 17b further displace in the forward direction, and as illustrated in FIG. 5 and FIG. 6, fully displace in the forward direction. In this way, in this example, when the bias spring 32a interferes in the forward-backward with the receiving surface 57 that is provided on the rear-end section of the gear housing 12, which is a separate member existing further in front, the locked state of the spring-side locking sections 40 of the bias spring 32a with the locking tabs 41, which are the bracket-side locking sections of the support bracket 17b, is released. Therefore, during the stroke in the forward direction through which the outer column 11a of the steering column 4b and the support bracket 17b are able to displace, the bias spring 32a does not stick between the receiving surface 57 of the gear housing 12 and the support bracket 17b. As a result, the outer column 11a and the support bracket 17b are allowed to smoothly displace in the forward direction during a secondary collision.

Moreover, when moving from the state illustrated in FIG. 3 and FIG. 4 to the state illustrated in FIG. 5 and FIG. 6, there is no interference in the forward-backward direction of the support bracket 17b and the bias spring 32a. Therefore, together with being able to maintain a large stroke during a secondary collision, it becomes possible for the outer column 11a and the support bracket 17b to smoothly displace in the forward direction over the entire length of this stroke. As the outer column 11a and the support bracket 17b displace in the forward direction, the locking tabs 41 cause the locking-arm sections 36 of the bias spring 32a to elastically deform upward, and in this state, the locking tabs 41 displace in the forward direction while sliding along the bottom ends of these locking-arm sections 36, however, interference due to this kind of sliding contact does not prevent smooth displacement in the forward direction of the outer column 11a and support bracket 17b. Furthermore, the area of contact between the pressure section 35a of the bias spring 32a and the receiving surface 42 of the steering column 4b also does not prevent smooth displacement in the forward direction of the outer column 11a and support bracket 17b.

In this example, spring-side guiding sections 55 that are vertically in parallel or nearly in parallel with respect to the direction that the guiding member 46 guides the support bracket 17b are provided at least on the portions (portions indicated by a in FIG. 1) of the locking-arm sections 36 of the bias spring 32a from the front ends of the spring-side locking sections 40 to the positions that are aligned in the forward-backward direction with the locking tabs 41 in the state in which the steering column 4b and support bracket 17b have displaced all the way in the forward direction. Therefore, after the bias spring 32a interferes with the rear-end section of the gear housing 12 during a secondary collision and the bias spring 32a stops and does not displace in the forward direction, it is possible for the displacement in the forward direction of the support bracket 17b with respect to the bias spring 32 to be performed smoothly.

Moreover, in this example, a coating layer made of a low-friction material is formed over the entire bias spring, and grease is applied to the portions of engagement between the spring-side locking sections 40 of the bias spring 32a and the locking tabs 41 of the support bracket 17b, and area of contact between the pressure section 35a and the receiving surface 42 of the rod-shaped member 28. Therefore, after the bias spring 32a comes in contact with the rear-end section of the gear housing 12 during a secondary collision and displacement in the forward direction of the bias spring 32a is prevented, it is possible to smoothly perform displacement in the forward direction of the outer column 11a and the support bracket 17b with respect to the bias spring 32a. Moreover, it is possible to prevent the occurrence of noise due to rubbing, friction, vibration and the like in these engaged portions and areas of contact. The coating layer of low-friction material should be formed on at least the spring-side locking sections 40 of the bias spring 32a. It is also possible to apply the grease to only the engaged portions between the spring-side locking sections 40 and the locking tabs 41 of the support bracket 17b.

INDUSTRIAL APPLICABILITY

The present invention can be widely applied to no only tilt and telescopic steering apparatuses, but can also be applied to tilt steering apparatuses that has a shock-absorbing mechanism regardless of whether or not there is a telescopic mechanism.

EXPLANATION OF REFERENCE NUMBERS

1 Steering wheel
2 Steering shaft
3 Steered wheels
4, 4a, 4b Steering column
5 Steering-assist apparatus
6 Tie rod
7 Steering gear unit
8 Inner shaft
9 Outer shaft
10 Inner column
11, 11a Outer column
12 Gear housing
13 Output shaft
14 Front-side support bracket
15 Vehicle body
16 Pivot shaft
17, 17a Support bracket (Rear-side support bracket)
18, 18a Support-plate section
19, 19a Connecting plate
20 Notch
21 Capsule
22 Engaging groove
23 Through hole in the up-down direction
24 Held section
25, 25a Column-side bracket
26 Column-side through hole
27 Vehicle-side through hole 28 Rod-shaped member
29 Connecting nut
30 Adjustment lever
31 Head section
32, 32a Bias spring
33, 33a Coil-spring section
34, 34a Front-plate section
35, 35a Pressure section
36 Locking-arm section
37 Straight section
38 First connecting section
39 Second connecting section
40 Spring-side locking section
41 Locking tab
42 Receiving surface
43 Upper bracket
44 Continuous-plate section
45 Guided-side through hole
46 Guiding member
47 Fastening-plate section
48 Guiding-plate section
49 Fastening through hole
50 Fastening flange section
51 Small fastening-side through hole
52 Long guiding-side hole
53 Bolt
54 Nut
55 Sliding plate
56 Spring-side guiding section
57 Receiving surface

What is claimed is:

1. A tilt steering apparatus comprising:
a steering column having a front section that is supported by a portion fixed to a vehicle body by way of a pivot shaft that is arranged in a width direction of the vehicle body, the steering column being able to pivotally displace around the pivot shaft and supporting a steering shaft on an inside of the steering column so as to freely rotate;
a support bracket having a connecting-plate section that is supported by the vehicle body so as to be able to separate in a forward direction of the vehicle body, and a pair of support-plate sections that are fastened to the connecting-plate section so as to be suspended downward, and by expanding or contracting a space between the pair of support-plate sections, are capable of a state of holding the steering column from both sides in the width direction, and a state of allowing the pivotal displacement of the steering column; and
a bias spring assembled between the steering column and the support bracket in a state of being able to displace in the forward direction together with the steering column and the support bracket, and applying a upward pressure force to the steering column;
the bias spring comprising a pair of locking-arm sections and a pressure section;
the pair of locking-arm sections having spring-side locking sections that are formed in part thereof, and the spring-side locking sections being locked with bracket-side locking sections that are formed in the support bracket;
the pressure section being directly or indirectly locked with part of the steering column, and causing an upward pressure force to act on the steering column with the spring-side locking sections as a fulcrum; and
when the bias spring interferes in a forward-backward direction of the vehicle body with a member that is located further in front of the bias spring during a stroke through which the steering column and the support bracket are able to displace in the forward direction during a secondary collision, a locked state between the spring-side locking sections and the bracket-side locking sections being released, the bias spring stopping in a place without displacing in the forward direction, and the steering column and the support bracket being allowed to further displace in the forward direction.

2. The tilt steering apparatus according to claim 1, wherein when the locked state between the spring-side locking sections and the bracket-side locking sections is released and the steering column and the support bracket displace further in the forward direction, there is no interference in the forward-backward direction between the bias spring and the support bracket.

3. The tilt steering apparatus according to claim 1, wherein the bias spring is made of a single wire and further comprises a pair of coil-spring sections;
the pressure section is formed by bending a middle section of the wire;
the pair of coil-spring sections is formed by winding portions near both end of the wire into a spiral shape, and so as to be separated from each other in the width direction;
the pair of locking-arm sections are formed from both end sections of the wire and in a state so as to extend rearwardly from end sections on opposite side of the pair of coil-spring sections; and
the bracket-side locking sections are provided on side surfaces in the width direction of the pair of support-plate sections.

4. The tilt steering apparatus according to claim 3, wherein the pair of coil-spring sections are located further in front of the pair of support-plate sections and do not overlap the pair of support-plate sections in the forward-backward direction, and are located in positions that are aligned with the pair of locking-arm sections in the width direction.

5. The tilt steering apparatus according to claim 3, wherein the pair of coil-spring sections and the pair of locking-arm sections are located further outward in the width direction than the pair of support-plate sections, and the bracket-side locking sections are provided on outside surfaces in the width direction of the pair of support-plate sections.

6. The tilt steering apparatus according to claim 1, further comprising a guiding member supported by the portion fixed to the vehicle body, and guiding the support bracket in the forward direction while preventing the support bracket from dropping.

7. The tilt steering apparatus according to claim 6, wherein spring-side guiding sections that are vertically in parallel or nearly in parallel with respect to a direction that the guiding member guides the support bracket are provided in portions of the pair of locking-arm sections that come in sliding contact with the bracket-side locking sections during a secondary collision.

8. The tilt steering apparatus according to claim 1, wherein a coating layer made of a low-friction material is formed on the spring-side locking sections.

9. The tilt steering apparatus according to claim 1, wherein grease is applied to engaging portions between the spring-side locking sections and the bracket-side locking sections.

* * * * *